United States Patent [19] [11] 4,124,562
Yui et al. [45] Nov. 7, 1978

[54] POLYOLEFIN COMPOSITION CONTAINING A NOVEL MODIFIED FILLER

[75] Inventors: Hiroshi Yui; Kazuhide Hayama, both of Yokkaichi; Hiroshi Takahashi, Tokyo, all of Japan

[73] Assignee: Mitsubishi Petrochemical Co., Ltd., Japan

[21] Appl. No.: 798,422

[22] Filed: May 19, 1977

Related U.S. Application Data

[63] Continuation-in-part of Ser. No. 660,234, Feb. 25, 1976, abandoned, which is a continuation of Ser. No. 519,770, Oct. 31, 1974, abandoned, which is a continuation of Ser. No. 360,783, May 16, 1973, abandoned.

[30] Foreign Application Priority Data

Jun. 20, 1972 [JP] Japan .................................. 47/61571

[51] Int. Cl.$^2$ ............................................. C08K 9/04
[52] U.S. Cl. ........................... 260/42.14; 106/308 M; 260/42.46; 260/42.56
[58] Field of Search ................ 260/42.14, 42.46, 42.56; 106/308 M

[56] References Cited

U.S. PATENT DOCUMENTS 3,156,666  11/1964  Pruett ................................ 260/42.46

FOREIGN PATENT DOCUMENTS 49-21445  2/1974  Japan.

*Primary Examiner*—James H. Derrington
*Attorney, Agent, or Firm*—Robert E. Burns; Emmanuel J. Lobato; Bruce L. Adams

[57] ABSTRACT

A filled polyolefin composition is described based upon a polyolefin resin filled with a mechanico-chemically modified filler. The filler, which may be the usual filler material, is modified by comminution, by mechanically exposing fresh surfaces of the original filler particles in the presence of a polymer of a vinyl monomer. The vinyl monomer should have at least one polar group capable of bonding with the freshly exposed surfaces of filler material as they are formed and exposed during the mechanical operation. The process for the production of the modified filler is included.

22 Claims, No Drawings

POLYOLEFIN COMPOSITION CONTAINING A NOVEL MODIFIED FILLER

RELATED APPLICATION

This is a Continuation-in-Part of Ser. No. 660,234, filed Feb. 25, 1976, now abandoned, which is a continuation of Ser. No. 519,770, filed Oct. 31, 1974, now abandoned and a continuation of Ser. No. 360,783, filed May 16, 1973, now abandoned.

FIELD OF THE INVENTION

This invention relates to polyolefin compositions and more particularly to such compositions including a novel filler that has its surface modified by engrafting with polyolefincompatible polymers.

BACKGROUND OF THE INVENTION

It has been noted that when inorganic fillers are combined with polyolefin resins, in order to decrease the heat of combustion of said resins and to provide compositions similar to wood or paper in appearance, that most inorganic filler particles have hydrophilic surfaces and consequently have a low affinity for the hydrophobic olefins. As a consequence, it has been difficult to incorporate sufficiently high contents of fillers into such polyolefins. Among the difficulties encountered have been the poor bonding of the filler particles to the polyolefin and the difficulty of properly incorporating the filler into the polyolefin by kneading operations. It has been found that the commonly used fillers of the prior art required considerable periods of time to ensure adequate and uniform distribution of the filler within the polymer matrix.

It has been difficult to completely and uniformly disperse the fillers in the matrix of the polyolefin resin by conventional kneading processes.

In order to overcome the above disadvantages it has previously been proposed to add a surfactant either to the inorganic filler material or to the polyolefin resin matrix. The surfactant was usually mixed into the matrix and not restricted to the interface between the filler and the matrix. As a result of the lack of segregation of the surfactant, inordinately high amounts of expensive surfactant were required and it has been noted that the melt-fall of the resultant composition during combustion is also increased. The melt fall is designed to describe the number of melted drops falling per minute when a sample of 2 millimeter thickness is burned according to ASTM D635. Lower rates are preferred.

When polypropylene is employed as the matrix for polyolefin type resins, the temperature of the resin at melting is in the vicinity of 200° C. At this temperature vaporization of the commonly used surfactants occurs and consequently an objectionably strong odor is released due to the vaporization and decomposition of the surfactant. Also as a result of the vaporization, the surfactant, is removed from the melt composition and a decrease in the physical properties of the final composition results.

SUMMARY OF THE INVENTION

It is an object of this invention to provide polyolefin compositions containing a filler with a high affinity to polyolefin resins. It is a further object of this invention to provide a filler which causes substantially no secondary coagulation with polyolefin resins. It is another object of this invention to provide polyolefin compositions having a high content of inorganic fillers, good bonding at the interface between the polyolefin and the filler and having high strength and bending stiffness.

It is a further object of this invention to provide polyolefin compositions containing fillers, said compositions having good heat resistance at temperatures commonly used for molding such compositions.

The objects and advantages of this invention can be obtained by combining, in a matrix of a polyolefin resin, a filler modified to have good affinity for the matrix.

The novel filler having such good affinity for the matrix is prepared by size-reducing a non-colloidal frangible filler material and exposing new fresh surfaces thereof in the presence of a polymer of a vinyl monomer having polar groups, thereby to bond said polymer by the polar groups of said polymer onto the new freshly formed, exposed surfaces of the filler. It is believed that the polymer is grafted onto these cracked fresh surfaces of the filler material at the polar groups of said polymer. Generally, the novel fillers are prepared by cracking and crushing an inorganic filler to form and expose new and fresh surfaces thereon in the presence of a polymer or copolymer including a vinyl monomer having at least one polar, group whereby said new surfaces are coated and engrafted with said polymer; and then bonding the polyolefin matrix to said coated, newly formed surfaces to form an adherent bond between the mechanicochemically modified filler and the matrix of the polyolefin.

DETAILED DESCRIPTION OF THE INVENTION

To obtain the novel mechanico-chemically modified filler utilized in this invention, the polymer of a vinyl monomer having polar groups, preferably a homopolymer or copolymer of such a vinyl monomer, is admixed with frangible brittle or crushable crystalline particles of the inorganic filler material. This filler with said admixed polymer is size-reduced as by grinding, crushing or shearing in suitable apparatus so that the active molecules of said vinyl polymer, formed by shearing or cutting of the polymer chains during the size-reducing, grinding or crushing operation, is mechanico-chemically bonded to the simultaneously new mechanically formed and exposed surfaces of the filler. The resulting novel, engrafted and coated, modified filler is then combined with the polyolefin type resin. The vinyl polymer may be dissolved in a solvent before admixing with the filler in order to assure adequate distribution of the small amounts of said polymer through the body of the filler material.

Among the suitable fillers which may be so mechanico-chemically modified for use in the compositions of this invention are the various non-colloidal, inorganic mineral and pigment fillers including metal oxides, hydroxides, carbonates, sulfates, silicates, silicate minerals and silica-containing minerals. Among the useful filler materials as defined above are: titanium oxide, aluminum oxide, ferric oxide, aluminum hydroxide, calcium carbonate, calcium sulfate, barium sulfate, calcium sulfite, calcium silicate, magnesium silicate, talc, mica, cellite, kaolin, asbestos, zeolite, silica, diatomaceous earth, etc. According to this invention it is also possible to use brittle organic and inorganic materials which had not previously been considered to be useful as fillers because of their incompatability with and difficulty for incorporation into polyolefin matrices.

Suitable homopolymers or copolymers of vinyl monomers which are useful in the preparation of the compositions of this invention for modifying the filler materials include homopolymers or copolymers of vinyl monomers having polar groups, such as for example; acrylic acid, acrylates, methacrylic acid, methacrylates, styrene, acrylamide, vinyl chloride, etc. and copolymers of such above mentioned vinyl monomers with each other and with α-olefins.

It is preferred, when metal carbonates, sulfates and sulfites such as for example calcium carbonate, calcium sulfate and barium sulfate are used as the filler, that such fillers be modified with a homopolymer or copolymer prepared from at least 70 wt.% of a monomer having the formula

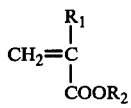

$$CH_2=\overset{R_1}{\underset{COOR_2}{C}} \qquad I$$

where $R_1$ is H or $CH_3$ $R_2$ is a straight or branched chain saturated or unsaturated alkyl group, arylkyl group, cycloalkyl group, haloalkyl group or an aminoalkyl group, said alkyl groups having at least 6 carbon atoms; and 0–30 wt.% of a monomer which is an unsaturated carboxylic acid or the anhydride of such an acid, said acid having more than 3 carbon atoms such as acrylic acid, methacrylic acid, maleic anhydride.

It has been found that when a polymer is prepared from the monomers similar to formula I, but having straight or branched saturated or unsaturated alkyl groups having less than 5 carbon atoms, the resultant modified filler, has such a low affinity to polyolefins that the resultant composition is inferior as regards strength and other physical properties as compared to polymers included within the ambit of formula I.

When metal oxides, hydroxides, silicates and silicate minerals are used as the filler material, it is preferred to modify such fillers with a homopolymer or copolymer prepared from more than 70 wt.% of the monomer according to formula I; and the balance being an α,β-ethylene compound according to said second monomer (II) having a amide, amino, epoxy, ether or hydroxy group; as for example acrylamide, glycidyl methacrylate, hydroxyethyl methacrylate, etc.

The terms comminute or size-reduce as used herein describe a mechanical process upon a brittle, frangible material which involves a crushing or fracturing of the solid crystalline structure of the materials. The materials are fractured in said process to expose fresh surfaces thereof. This is in contrast to the separation of agglomerated particles as in the preparation of hydrated agglomerates of colloidal gels. The comminution of this invention may be achieved by various crushing, grinding, shearing, cutting, spalling devices where the brittle solid particles are comminuted to expose new, freshly-formed surfaces.

The term "freshly-formed surfaces" as utilized herein distinguish from the separation of previously existing agglomerated particles with the exposure of the previously existing particulate surface.

The polymer used for modifying the fillers according to this invention preferably should have a molecular weight about 5,000 and preferably should be in the range 10,000 to 30,000. When the molecular weight of the polymer is less than 5,000, the resultant composite, including the polyolefin matrix, has inferior heat resistance, causes severe odor problems when the polymer is heated, and there is also a marked deterioration of physical properties of the resultant composite.

The modified filler used for preparing the composite composition of this invention is prepared by the size-reduction of frangible particles of the filler in the presence of the polymer of the vinyl monomer having polar groups. The size-reduction is accomplished by a crushing, milling or grinding unit operation as defined in Perry Chemical Engineers Handbook (3rd Ed) upon the hard non-colloidal filler particles in such a manner as to cause fracture of the original filler particles in order to form fresh or freshly-exposed surfaces. This size-reduction operation, carried out in the presence of the vinyl polymer may be carried out in the presence of an organic solvent for said polymer in order to assure adequate distribution of the polymer to contact with the surfaces of the filler particles as they are freshly exposed during the crushing operation. The organic solvent, when used, should preferably be a non-polar solvent.

In general it is preferred that the size-reduction be carried out in an atmosphere inert to said filler and said polymer including such gases as air, nitrogen, argon etc. or under a substantial or partial vacuum. It is preferable that the atmosphere have a low moisture content in order to ensure good wetting of the freshly exposed surfaces of the filler by the vinyl polymer.

During the size-reduction of the filler in the presence of a polymer, it is preferred that the particle size of the final product of coated filler be less than about 5μ particle diameter on the average. The starting particles of filler for particle size reduction by crushing, grinding or similar unit operations should preferably be about 5 to 10 times the final particle diameter. However, even greater size-reduction are countenanced by this invention. Size-reductions as great as 100 to 1 are included within the ambit of this invention.

The amount of polymer of the vinyl monomer used is in the range of 0.005 to 10% by weight based upon the filler. However, it is preferred to use 0.05 to 5% by weight with approximately 1% by weight being optimal for certain of the polymers.

The size reduction operation, during which the freshly formed surface of the filler is exposed to the vinyl polymer, may be carried out in such apparatus as ball mills, vibration mills, pot mills, hammer mills, gyrotory crushers, pulverizers, speedline mills, sand grinders, colloid mills, micron mills, etc. Any apparatus suitable for the simultaneous size-reduction of the two components, i.e. the filler and the vinyl polymer may be used. When the size-reduction takes place with the vinyl polymer dissolved in a solvent, an appropriate modification of the above mentioned apparatus is of course intended.

When the initial particles of the filler are mechanically crushed during the size reduction operation, it is believed that active radicals or ions are formed by the shearing and cutting of the chemical bonds. It is also believed that the impact on the frangible particles of the filler yields newly formed surfaces at which surfaces there are exposed crystal charges. Before these charges are dissipated, it is believed that the charged molecules of the polymer become engrafted upon these charged, newly exposed crystal surfaces.

The active radicals or ions at the newly formed surfaces and the ends of the molecules of the polymers join and are bonded to form metal-carbon bonds or metal-oxygen-carbon bonds so that the modified filler is grafted with said polymer of the vinyl monomer on said newly formed surface.

The novel modified non-colloidal filler, modified by the mechanico-chemical size-reduction in the presence of the vinyl polymer having a polar charge, is then used to form the compositions of this invention wherein the filler is kneaded or similarly incorporated into the matrix of the polyolefin resin to form the final composition of this invention.

Suitable polyolefin resins which can be used for this purpose include homopolymers or copolymers of $\alpha$-olefins e.g., ethylene, propylene, butene-1; or copolymers of said $\alpha$-olefin with vinyl monomers e.g., vinylacetate, acrylate, styrene, vinylchloride, etc.

The incorporation of the matrix of polyolefin resin with said novel modified filler can be carried out in the conventional manner by conventional kneading, crushing and similar incorporation means. The amount of said modified filler is selected, depending upon the specific applications, so as to provide desirable formability, quality, cost etc.

When the content of said modified filler is above about 30 wt.% based on total composition, the resulting composition has high impact strength, good bending stiffness and well balanced characteristics, suitable for use as corrugated cardboard, and synthetic wood.

When the content of said modified filler is greater than 50 wt.% based on total composition, the heat of combustion of the composition is quite low and it is unnecessary to use special combustion furnaces of special heat resistant material as are required for the combustion of the polyolefin itself. It is thus possible to easily burn the composition in the usual combustion furnace.

When a large amount of the conventional filler is combined into polyolefin resin, the resulting composition becomes brittle. However, when the modified filler according to this invention is combined with such resins, the affinity of said modified filler to polyolefin resin is very great and as a result the composition has good bending stiffness even though more than 50 wt.% of said modified filler may be combined in the composition.

The composition containing the modified filler have good transparency in comparison with conventional compositions containing the conventional filler. When the content of the modified filler is less than 30 wt.%, the transparency of the composition is very good.

Various antioxidants, ultraviolet absorbers, antistatic agents or the like, well known in this art, may be incorporated into the composition. Such suitable components may be mixed and kneaded into the mix during the incorporation of the modified filler.

In order to increase compatibility during the incorporation operations such as by kneading, it is preferred to combine the modified filler with a mixture of polyolefin and a rubber-like material e.g., ethylene-propylene type rubber, styrene-butadiene type rubber, etc.

Two or more than two types of said modified fillers may be combined. Also modified fillers having different particle size can be incorporated into the final composition by kneading.

In accordance with this invention, the compositions having good bending stiffness are formed by combining the matrix of polyolefin resin with the modified filler having high affinity to polyolefin during a size reduction unit operation. Moreover, the transparent composition can be easily obtained as a result of this invention because the incorporation of bubbles into the matrix can be prevented. Such characteristic qualities and properties cannot be expected from the addition of surfactants alone.

In the composition of this invention, the grafted polymer on said modified filler is combined with the molecules of polyolefin in an amorphous region so that the strength of the composition is improved, and also the melt-fall of the composition at combustion is decreased.

In accordance with this invention, it is possible to prepare excellent modified fillers by using polymers of vinyl monomers having polar groups whose decomposition temperature is higher than 250° C. It is possible to prepare such polyolefin compositions having no smell caused by evaporation or decomposition of the modifier components.

When a heavy metal salt of acrylic acid or methacrylic acid is used as a component for the preparation of the vinyl polymers having polar groups, it is possible to obtain modified fillers having colors resulting from the inherent color of the metal ions. When said color-modified filler is combined in the composition, it is possible to obtain compositions having clear color with good durability compared to previous compositions where poor-wetting pigments had to be used.

The composition of this invention having relatively low contents of modified filler are useful for such applications as packaging films, synthetic paper, for string or cords, for packaging trays and containers, etc. The compositions of this invention having relatively high contents of modified filler are useful for such applications as corrugated cardboards, synthetic woods, resilient packaging materials, gaskets, formed articles, etc.

Having now generally described the invention, further understanding thereof can be achieved by reference to the appended Examples which are provided herein for purposes of illustration of modes of practicing various aspects of this invention only and are not intended to be limiting in any manner.

EXAMPLE 1

In a sand grinder having 10 liter capacity, 5 kg of calcium carbonate particles having average diameter of $20\mu$ were crushed in the presence of 3 kg of a solution of 50 g of polymer of lauryl methacrylate in n-hexane. The temperature was maintained at 20° C. in an air atmosphere. The grinder was operated at 1800 rpm at a feeding rate of 1 liter/minute. After crushing, the solvent was removed by a centrifugal separator followed by vacuum drying at 50° C. at $10^{-1}$ mmHg for 24 hours. A surface-modified calcium carbonate having average diameter of $2\mu$ results. According to infrared spectrum analysis, it was confirmed that 0.5% by weight of lauryl methacrylate polymer was grafted onto the calcium carbonate.

The resulting modified calcium carbonate was mixed with individual portions of polypropylene, propylene-ethylene copolymer and high density polyethylene by roller-mixing.

As shown in Table 1, the modified calcium carbonate had good compatibility with polyolefin when compared to the unmodified calcium carbonate, so that a larger amount of the modified filler can be combined with the polyolefin.

When the equal contents of filler were combined, the compositions containing the modified filler had better elongation and impact strength as shown in Table 1 when compared to those with the unmodified filler.

Table 1

| Composition | | | | Compatibility[4] roller-kneading time (min.) | Elongation (%) | Impact strength Dynstat (kgcm/cm$^2$) |
|---|---|---|---|---|---|---|
| Polyolefin | wt. % | Filler | wt. % | | | |
| Polypropylene[1] | 50 | modified | 50 | 10 | 53 | 4.1 |
|  | 40 | calcium carbonate | 60 | 11 | 27 | 2.9 |
|  | 30 | (2μ average | 70 | 13.5 | 20 | 2.2 |
|  | 20 | diameter) | 80 | 15 | 11 | 1.7 |
| Polypropylene[1] | 50 | unmodified | 50 | 18 | 19 | 1.9 |
|  | 40 | calcium carbonate | 60 | 20 | 7 | 1.1 |
|  | 30 | (2μ average | 70 | 23 | brittle | brittle |
|  | 20 | diameter) | 80 | incompatible | — | — |
| High density Polyethylene[2] | 50 | modified | 50 | 9.5 | 37 | 5.2 |
|  | 40 | calcium carbonate | 60 | 10.5 | 21 | 3.1 |
|  | 30 | (2μ average | 70 | 13 | 15 | 2.5 |
|  | 20 | diameter) | 80 | 15 | 10 | 1.8 |
| High density Polyethylene[2] | 50 | unmodified | 50 | 17.5 | 15 | 2.9 |
|  | 40 | calcium carbonate | 60 | 19.5 | 10 | 1.8 |
|  | 30 | (2μ average diameter) | 70 | 23 | brittle | brittle |
| Propylene-ethylene copolymer[3] | 50 | modified | 50 | 8.5 | 350 | 15.8 |
|  | 40 | calcium carbonate | 60 | 9.5 | 165 | 10.7 |
|  | 30 | (2μ average | 70 | 12 | 60 | 6.1 |
|  | 20 | diameter) | 80 | 14 | 21 | 3.7 |
|  | 50 | unmodified | 50 | 16.5 | 130 | 8.8 |
|  | 40 | calcium carbonate | 60 | 18.5 | 42 | 4.7 |
|  | 30 | (2μ average | 70 | 22 | 5 | 2.6 |
|  | 20 | diameter) | 80 | incompatible | — | — |

[1] polypropylene 230° C melt index 1.5 g/10 min. boiling n-heptan insoluble component 95 wt. %
[2] high density polyethylene 190° C melt index 1.0 g/10 min. density 0.936 g/cc.
[3] propylene-ethylene copolymer ethylene content 12% block copolymer 230° C melt index 1.0 g/10 min.
[4] Time required for uniformly dispersing filler, when 5 kg of the composition is kneaded on a roller mill.

EXAMPLE 2

In a vibration mill having 10 liter capacity, 500g of silica having 10μ of average diameter was crushed in the presence of 300 g of a solution of 5 g of ethylene-acrylic acid copolymer (acrylic acid content of 20 wt.%) in n-hexane, at 25° C. in a nitrogen atmosphere for 24 hours. After crushing, the solvent was separated by a centrifugal separator and the remainder was dried at 30° C. under the reduced pressure of $10^{-1}$ mmHG for 24 hours, to obtain a surface-modified silica having average diameter of 1μ.

According to infrared spectrum analysis, it was confirmed that 0.4% by weight of ethylene-acrylic acid copolymer was grafted on the silica. The resulting mechanochemical-modified silica was mixed with a low density polyethylene formulation as shown in Table 2 and the mixture was kneaded and then blow by an inflation film-forming apparatus at 160° C. to yield a film having thickness of 30μ.

As shown in Table 3, the film containing the mechanochemical modified silica had excellent transparency without decreasing antiblocking characteristics compared with films containing the unmodified silica.

Table 2

| Low density polyethylene (melt index 2.0 g/10 min.) (density 0.924 g/cc) | 99.75 wt. % |
|---|---|
| 2,5-di-tert-butyl-4-methylphenol | 0.05 wt. % |
| oleic amide | 0.10 wt. % |
| filler | 0.10 wt. % |

Table 3

| Filler | Physical Property | |
|---|---|---|
|  | Haze % | Blocking |
| modified silica | 6.2 | 300 |
| unmodified silica | 8.1 | 300 |

EXAMPLE 3

In a pot mill, kaolin clay having average diameter of 25μ was crushed in the presence of 0.3% by weight of powdered sodium acrylate polymer (decomposition temperature higher than 250° C.) at 20° C. in air for 6 hours to obtain sodium acrylate polymer engrafted on mechanochemical-modified kaolin clay having average diameter of 2μ. The resulting mechanochemical engrafted and modified kaolin clay was mixed and kneaded with polypropylene at 230° C. by a roller mill.

As a reference, kaolin clay coated with 0.3% by weight of stearic acid having same average diameter, and unmodified kaolin clay having same average diameter were respectively mixed and kneaded with polypropylene by the roller mill in the same conditions.

As shown in Table 4, when the sodium acrylate polymer engrafted mechanochemical-modified kaolin clay was used, the smell during the kneading was minimal when compared to that of stearic acid-coated kaolin clay. The melt-fall value of the composition at combustion was also low and the composition was suitable for combustion. The physical properties of the composition containing said sodium acrylate polymer mechanochemical-modified kaolin clay were superior when compared to those of unmodified kaolin clay or stearic acid-coated kaolin clay.

Table 4

| Filler | Properties of composition[1] | | | |
|---|---|---|---|---|
| | Smell at kneading | Elongation (%) | Impact Strength Dynstat (kgcm/cm²) | Melt[2] fall value at combustion (drops/min.) |
| mechanochemical modified kaolin clay (sodium acrylate polymer) | none | 25 | 2.7 | 2 |
| stearic acid coated kaolin clay | severe smell | 17 | 2.3 | 14 |
| unmodified kaolin clay | none | 7 | 1.0 | 2 |

[1]polypropylene (melt index 1.0) (boiling n-heptane) insoluble component) 40 wt. %
filler 60 wt. %
[2]Melted drops falling per minute when a sample having thickness of 2 mm is burned according to ASTM D635.

EXAMPLE 4

In accordance with Example 1 but using as filler modifiers (1) 85% of laurylmethacrylate and 15% of acrylic acid, or (2) 65% of laurylmethacrylate and 30% of cyclohexyl methacrylate and 50% of methacrylic acid, the compositions were prepared under the conditions stated in Table 5. The results are also shown in Table 5.

Table 5

| Composition | | | | | |
|---|---|---|---|---|---|
| Polyolefin | Wt. % | Filler | wt. % | Compatibility time for roller-kneading (min.) | Elongation (%) | Impact strength Dynstat (Kgcm/cm²) |
| Polypropylene | 40 | modified CaCO₃ (modifier 1) | 60 | 10.5 | 28 | 3.0 |
| | 40 | modified CaCO₃ (modifier 2) | 60 | 10.5 | 29 | 3.1 |
| Propylene-ethylene copolymer | 40 | modified CaCO₃ (modifier 1) | 60 | 9 | 175 | 11.5 |
| | 40 | modified CaCO₃ (modifier 2) | 60 | 9 | 173 | 12.0 |

EXAMPLE 5

Kaolin clay having average diameter of 40μ was mixed with 2.0% by weight of modifiers of the methacrylate copolymers shown in Table 6, No. 1–3, in 50% n-heptane solution and then the mixture was crushed in a micron mill at 20° C. in air at the feed rate of 500 g/min, whereby the fine kaolin clay having average diameter of 0.5μ was grafted with 1.0% by weight of the methacrylate copolymer.

The resulting engrafted modified kaolin clay was blended with high density polyethylene at 200° C. in a roller mill. As a reference composition No. 4, a kaolin clay (same average diameter) modified with dicumylperoxide, 1, 3-butylene-dimethylacrylate and quaternary ammonium chloride in accordance with Example 1 of U.S. Pat. No. 3,471,439, was blended with the high density polyethylene.

An unmodified kaolin clay composition No. 5 was also blended with the high density polyethylene. When the kaolin clay modified by crushing in the presence of the methacrylate copolymers, were blended, the compositions had higher elongation and high impact strength and whiteness and low heat deterioration by comparison to the reference and control specimens.

Table 6 A

| No. | Modifier | Method |
|---|---|---|
| 1 | copolymer prepared from lauryl methacrylate : cyclohexyl methacrylate : hydroxyethyl methacrylate = 60 : 30 : 10 | cocrushing |
| 2 | copolymer prepared from lauryl methacrylate : cyclohexyl methacrylate : glycidyl methacrylate = 60 : 30 : 10 | cocrushing |
| 3 | copolymer prepared from lauryl methacrylate : cyclokexyl methacrylate : dimethylaminoethyl methylate = 60 : 30 : 10 | cocrushing |
| 4 | U.S.P. 3,471,439 (References) | |
| 5 | Unmodified filler | |

TABLE 6 B

| Composition | | | | | | | |
|---|---|---|---|---|---|---|---|
| polyolefin | Wt % | mixed kaoline clay (see Table 6 A) | Wt % | Elongation (%) | Impact strength Dynstat (Kg.cm/cm²) | Whiteness | Heat deterioration |
| High density polyethylene | 68.2 | 1 | 31.8 | 55 | 11.2 | 81 | 350 |
| | 68.2 | 2 | 31.8 | 59 | 10.8 | 82 | 330 |
| | 68.2 | 3 | 31.8 | 51 | 10.5 | 81 | 340 |
| | 68.2 | 4(Ref.) | 31.8 | 35 | 7.3 | 68 | 100 |
| | 68.2 | 5(Cont.) | 31.8 | 17 | 3.5 | 82 | 300 |
| metl index 3.0g/10 min. density 0.960 g/cc | 40 | 1 | 60 | 19 | 2.9 | 73 | 220 |
| | 40 | 2 | 60 | 20 | 2.8 | 74 | 210 |
| | 40 | 3 | 60 | 18 | 2.7 | 75 | 230 |
| | 40 | 4(Ref.) | 60 | 12 | 2.3 | 61 | 60 |
| | 40 | 5(cont.) | 60 | 7 | 1.4 | 75 | 200 |

EXAMPLE 6

The modified fillers were prepared by the following processes.

(1) Talc having average diameter of 40μ was crushed in the presence of a copolymer (①- A) prepared from laurylmethacrylate:

dimethyaminoethyl methacrylate = 90 : 10, or a copolymer (①- B) prepared from butylmethacrylate:

dimethylaminoethyl methacrylate = 90 : 10, by a micron mill to form the modified filler having average diameter of 3μ.

(2) Talc having average diameter of 10μ was crushed in the presence of the copolymer (①- A) by the micron mill to form the modified filler having average diameter of 3μ.

(3) As a control, unmodified talc having average diameter of 3μ, 60% of said filler was blended with 40% of propylene-ethylene block copolymer (ethylene content of 12%).

Table 7

| Filler | Compatibility time for roller-kneading | Properties of Composition Elongation (%) | Impact strength Dynstat (Kg. cm/cm²) |
|---|---|---|---|
| ①- A | 11 | 30 | 3.8 |
| ①- B | 15 | 18 | 3.0 |
| ② | 16 | 15 | 2.9 |
| ③ | 18 | 9 | 2.7 |

(all-percentages are by weight)

EXAMPLE 7

820 g of silica having average diameter of 10μ was crushed together with 500 g of poly-2-ethylhexylacrylate (n-butyl polymer was not commercially available), at 20° C. for 120 hours by a micron-mill to form crushed particles having average diameter of 0.2μ. 1320 g of poly-2-ethylhexylacrylate grafted silica was obtained.

264 g of the resulting poly-2-ethylhexylacrylate-grafted silica was blended with 100 g of polyethylene in a roller mill at 160° C. to obtain the following composition.

| | |
|---|---|
| Polyethylene | 27.5% |
| Poly-2-ethylhexyacrylate grafted silica (silica content is 45%) | 72.5% |

The composition was molded in a press to form a sheet and the elongation and Dynstat impact strength of the sheet were measured. The results are shown in Table 8.

Comparative Example 7X

Reference Pruett: U.S. Pat. No. 3,156,666

In accordance with the process of Example II of U.S. Pat. No. 3,156,666, (using poly-2-ethylhexylacrylate instead of n-butyl polymer), 100 g of poly-2-ethylhexylacrylate, 100 g of polyethylene and 164 g of colloidal silica gel having average diameter 0.2μ (as ultimate particle) were blended in the rubber mill at 100° C.–120° C. to give the following composition:

| | |
|---|---|
| Polyethylene | 27.5% |
| Poly-2-ethylhexylacrylate | 27.5% |
| Silica gel | 45 % |

The composition was molded by a press to form a sheet and the elongation and Dynstat impact strength of the sheet were measured.

The results are shown in Table 8.

Table 8

| Experiment 1 | Elongation (%) | Dynstat Impact (kg-cm/cm²) |
|---|---|---|
| Example 7 | 60 | 7.3 |
| Pruett Example 7X | 20 | 3.0 |

EXAMPLE 8

Our invention:

200 g of silica having average diameter of 10μ was crushed together with 200 g of polyoctyldecylmethacrylate by a micron-mill at 20° C. for 120 hours to give 800 g of polyoctyldecylmethacrylate grafted silica having average diameter of 0.2μ.

240 G of the resulting polyoctyldecylmethacrylate grafted silica was blended with 60 g of propylene-ethylene block copolymer at 200° C. in a roller mill to give the following composition.

| | |
|---|---|
| Propylene-ethylene block copolymer | 20% |
| Polyoctyldecylmethacrylate grafted silica (silica content 60%) | 80% |

The composition was molded by a press to form a sheet and the elongation and Dynstat impact strength of the sheet were measured.

The results are shown in Table 9.

Comparative Example 8X

Reference Pruett: U.S. Pat. No. 3,156,666

In accordance with the process of U.S. Pat. No. 3,156,666, 60 g of propylene ethylene block copolymer and 60 g of polyoctyldecylmethacrylate and 180 g of colloidal silica gel having average diameter of 0.2 (as ultimate particle) were blended in the rubber mill at 110° C. to give the following composition:

| | |
|---|---|
| Propylene-ethylene block copolymer | 20% |
| Polyoctyldecylmethacrylate | 20% |
| Silica gel | 60% |

The composition was molded by a press to form a sheet and the elongation and Dynstat impact strength of the sheet were measured.

The results are shown in Table 9.

Table 9

| Experiment 2 | Elongation (%) | Dynstat Impact (kg-cm/cm²) |
|---|---|---|
| Example 8 | 55 | 8.3 |
| Pruett (Example 8X) | 10 | 3.2 |

It is apparent from these results that the grafted crushed particles of the present invention, as compared with the prior art, provide a qualitative difference to the final composition that is greatly desired and of economic interest in providing stronger articles.

What is claimed is:

1. A polyolefin composition comprising a polyolefin resin matrix having incorporated therein a modified filler comprising a particulate frangible filler material having a polymer which is a homopolymer or copolymer of a vinyl monomer bearing polar groups, directly engrafted onto freshly mechanically-exposed surfaces of said filler material, said modified filler being obtained by mixing a frangible filler with said polymer and being carried out so as to fracture the original filler particles to form freshly, exposed surfaces thereof and thus graft said filler onto said polymer, comminuting said filler to a particle size of about 0.5μ to less than 5μ while said filler is mixed with said polymer at a temperature of about 20°-25° C., the initial particle size of said filler being about 5 to 100 times larger than that of the comminuted filler, said comminuting being carried out so as to fracture the original filler particles to form freshly, exposed surfaces thereof and thus graft said filler onto said polymer.

2. The composition according to claim 1 wherein said vinyl monomer has the formula

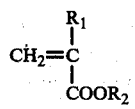

where $R_1$ is H or $CH_3$

Where $R_2$ is a saturated or unsaturated alkyl group, an aralkyl group, a cycloalkyl group, an haloalkyl group or an aminoalkyl group, each of said groups having at least six carbon atoms.

3. The composition according to claim 1 wherein said polymer is a copolymer comprising at least 70 weight % of a monomer having the formula

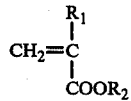

Where $R_1$ is H or $CH_3$

Where $R_2$ is a saturated or unsaturated alkyl group, an aralkyl group, a cycloalkyl group, an haloalkyl group or an aminoalkyl group each of said groups having at least six carbon atoms and up to 30 wt % of a monomer selected from the group consisting of monomers of unsaturated carboxylic acids having at least 3 carbon atoms, anhydrides of such acids and α,β-ethylene compounds bearing at least one amide, amino, epoxy ether or hydroxy group.

4. The composition according to claim 1 wherein said polymer is a hompolymer or copolymer of lauryl acrylate.

5. The composition according to claim 1 wherein said polyolefin matrix is polyethylene, polypropylene, ethylene propylene copolymer or mixtures thereof.

6. The composition according to claim 1 wherein said filler is an inorganic filler used in the papermaking art.

7. The composition according to claim 1 wherein said filler is selected from the group of frangible hydrophyllic mineral oxides, hydroxides, carbonates, sulfates, silicates, silicate and silica minerals and the freshly exposed surfaces are exposed during concurrent size reduction and engrafting of said frangible material with said polymer.

8. The composition according to claim 7 wherein said filler is selected from the group consisting of titanium oxide, aluminum oxide, ferric oxide, aluminum hydroxide, calcium carbonate, calcium sulfate, barium sulfate, calcium sulfite, calcium silicate, magnesium silicate, talc, mica, cellite, kaolin, asbestos, zeolite, silica and diatomaceous earth.

9. A process for the preparation of a polyolefin resin composition containing a modified filler comprising mixing a frangible filler with a polymer which is a homopolymer or a copolymer of a vinyl monomer having polar groups and comminuting said filler to a particle size of about 0.5μ to less than 5μ while said filler is mixed with said polymer at a temperature of about 20°-25° C., the initial particle size of said filler being about 5 to 100 times larger than that of the comminuted filler, said comminuting being carried out so as to fracture the original filler particles to form freshly, exposed surfaces thereof and thus graft said filler onto said polymer and then incorporating the thus grafted filler into a polyolefin resin composition.

10. The process according to claim 9, wherein the amount of said polymer mixed with said filler is about 0.005 to 10 wt.% based upon the weight of filler material.

11. The process according to claim 9 wherein said modified grafted filler material is incorporated into said polyolefin matrix by a kneading operation.

12. The process according to claim 9 wherein the particulate filler material having grafted unto freshly exposed surfaces thereof 0.005 to 10 wt % of said filler weight, of the polymer of said vinyl monomer.

13. The process according to claim 9, in which said polymer is said homopolymer of a copolymer containing at least 70% by weight of said vinyl monomer and in which said vinyl monomer has the formula

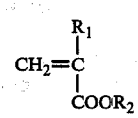

wherein $R_1$ is H or $CH_3$
where $R_2$ is a saturated or unsaturated alkyl group, an aralkyl group, a cycloalkyl group, an haloalkyl group or an aminoalkyl group, each of said groups having at least six carbon atoms.

14. The process according to claim 9, in which said polymer is a homopolymer or copolymer of lauryl acrylate and said filler is selected from the group consisting of titanium oxide, aluminum oxide, ferric oxide, aluminum hydroxide, calcium carbonate, calcium sulfate, barium sulfate, calcium sulfite, calcium silicate, magnesium silicate, talc, mica, cellite, kaolin, asbestos, zeolite, silica and diatomaceous earth.

15. A process for the preparation of a polyolefin resin composition containing a modified filler comprising mixing a frangible filler having an original particle size of about 10μ to about 40μ with a polymer which is a homopolymer or a copolymer of a vinyl monomer bearing polar groups and comminuting said filler to a particle size of about 1/5 to about 1/100 of the original particle size while said filler is mixed with said polymer at a temperature of about 20° to 25° C., said comminuting being carried out so as to fracture the original filler particles to form freshly, exposed surfaces thereof and thus graft said filler onto said polymer and then incorporating the thus grafted filler into a polyolefin resin composition.

16. The process according to claim 15, wherein the amount of said polymer mixed with said filler is about 0.005 to 10 wt % based upon the weight of filler material.

17. The process according to claim 15, in which said polymer is said homopolymer or a copolymer containing at least 70% by weight of said vinyl monomer and in which said vinyl monomer has the formula $$CH_2=\underset{\underset{COOR_2}{|}}{\overset{\overset{R_1}{|}}{C}}$$

wherein $R_1$ is H or $CH_3$
where $R_2$ is a saturated or unsaturated alkyl group, an aralkyl group, a cycloalkyl group, an haloalkyl group or an aminoalkyl group, each of said groups having at least six carbon atoms.

18. The process according to claim 15, in which said polymer is a homopolymer or copolymer of lauryl acrylate and said filler is selected from the group consisting of titanium oxide, aluminum oxide, ferric oxide, aluminum hydroxide, calcium carbonate, calcium sulfate, barium sulfate, calcium sulfite, calcium silicate, magnesium silicate, talc, mica, cellite, kaolin, asbestos, zeolite, silica and diatomaceous earth.

19. A polyolefin composition comprising a polyolefin resin matrix having incorporated therein a modified filler comprising a particulate frangible filler material having a polymer which is a homopolymer or copolymer of a vinyl monomer bearing polar groups, directly engrafted onto freshly mechanically-exposed surfaces of said filler material, said modified filler being obtained by mixing a frangible filler having an original particle size of about 10μ to about 40μ with a polymer which is a homopolymer or a copolymer of a vinyl monomer bearing polar groups and comminuting said filler to a particle size of about 1/5 to about 1/100 of the original particle size while said filler is mixed with said polymer at a temperature of about 20° to 25° C., said comminuting being carried out so as to fracture the original filler particles to form freshly, exposed surfaces thereof and thus graft said filler onto said polymer.

20. A polyolefin composition according to claim 19, in which said polymer is said homopolymer or a copolymer containing at least 70% by weight of said vinyl monomer and in which said vinyl monomer has the formula $$CH_2=\underset{\underset{COOR_2}{|}}{\overset{\overset{R_1}{|}}{C}}$$

wherein $R_1$ is H or $CH_3$
wherein $R_2$ is a saturated or unsaturated alkyl group, an aralkyl group, a cycloalkyl group, an haloalkyl group or an aminoalkyl group, each of said groups having at least six carbon atoms.

21. A polyolefin composition according to claim 19, in which said polymer is a homopolymer or copolymer of lauryl acrylate and said filler is selected from the group consisting of titanium oxide, aluminum oxide, ferric oxide, aluminum hydroxide, calcium carbonate, calcium sulfate, barium sulfate, calcium sulfite, calcium silicate, magnesium silicate, talc, mica, cellite, kaolin, asbestos, zeolite, silica and diatomaceous earth.

22. A polyolefin composition according to claim 19, wherein said polyolefin matrix is polyethylene, polypropylene, ethylene propylene copolymer or mixtures thereof.

* * * * *